United States Patent [19]
Davis et al.

[11] Patent Number: 5,444,770
[45] Date of Patent: Aug. 22, 1995

[54] TELEPHONE HANDSET INTERFACE FOR AUTOMATIC SWITCHING BETWEEN VOICE AND DATA COMMUNICATIONS

[75] Inventors: Richard A. Davis, Boulder; Kenneth L. Frick, Westminster; Gregory Muir, Lyons; James Nowack, Boulder, all of Colo.

[73] Assignee: Radish Communications Systems, Inc., Boulder, Colo.

[21] Appl. No.: 158,994

[22] Filed: Nov. 30, 1993

Related U.S. Application Data

[63] Continuation-in-part of Ser. No. 877,328, May 1, 1992, which is a continuation-in-part of Ser. No. 589,203, Sep. 27, 1990, Pat. No. 5,164,982.

[51] Int. Cl.⁶ .............................................. H04M 11/00
[52] U.S. Cl. ...................................... 379/99; 379/442
[58] Field of Search .................................... 379/93–95, 379/97–99, 100, 106, 442, 443, 387, 397, 184, 194; 375/8, 13; 358/400, 406

[56] References Cited

U.S. PATENT DOCUMENTS

| | | | |
|---|---|---|---|
| 4,153,916 | 5/1979 | Miwa et al. | 358/406 |
| 4,367,374 | 1/1983 | Serrano . | |
| 4,387,271 | 6/1983 | Artom . | |
| 4,425,664 | 1/1984 | Sherman et al. | 375/8 |
| 4,606,044 | 8/1986 | Kudo | 375/13 |
| 4,815,121 | 3/1989 | Yoshida | 379/93 |
| 4,852,153 | 7/1989 | Streck | 379/442 |
| 4,856,049 | 8/1989 | Streck | 379/100 |
| 4,907,267 | 3/1990 | Gutzmer | 379/442 |
| 4,932,047 | 6/1990 | Emmons et al. | 379/98 |
| 5,014,299 | 5/1991 | Klupt et al. | 379/98 |
| 5,059,141 | 10/1991 | Scott | 379/442 |
| 5,164,982 | 11/1992 | Davis | 379/96 |
| 5,206,898 | 4/1993 | Nishijima | 379/442 |

*Primary Examiner*—Wing F. Chan
*Attorney, Agent, or Firm*—Dorr, Carson, Sloan and Birney

[57] ABSTRACT

A telephone interface system is inserted between the telephone handset and base to provide automatic switching between voice and data modes of communication. The interface includes a modem having a receive port coupled to the telephone base speaker lines and a transmit port switchably coupled to the base microphone lines, a switch for selectively coupling the telephone handset to the base, and a processor for monitoring data received by the modem and controlling the switch to automatically decouple the telephone handset from the base when data is being received or transmitted by the modem. The modem includes a tone generator that generates a predetermined start signal to signal a remote unit at the other end of the communication link to enter data mode prior to transmission of data. Similarly, the modem includes a tone detector to detect a start signal sent by the remote unit that causes the unit to switch into data mode in preparation for receiving data. The start signal can also include signals designating the rate at which data will be transmitted and its format.

21 Claims, 11 Drawing Sheets

TELEPHONE HANDSET INTERFACE FOR AUTOMATIC SWITCHING BETWEEN VOICE AND DATA COMMUNICATIONS

RELATED APPLICATION

The present application is a continuation in part of the Applicants' co-pending U.S. patent application Ser. No. 07/877,328, filed on May 1, 1992, entitled "Improved Telecommunication Display System," which is a continuation in part of Ser. No. 589,203, filed Sep. 27, 1990, now U.S. Pat. No. 5,164,982, issued on Nov. 17, 1992.

BACKGROUND OF THE INVENTION

1. Field of the Invention

The present invention relates generally to the field of telephony. More specifically, the present invention discloses an interface system for insertion between the telephone handset and base that provides for automatic switching between voice and data communications.

2. Statement of the Problem

The present invention is intended to address two separate, but related problems in communicating both voice and data by telephone. First, it is often desirable to be able to transmit data over a single telephone line interspersed with verbal discussions between the parties. This data can be in the form of visual images relevant to the conversation. For example, a travel agent might wish to show a telephone customer a travel itinerary as they discuss it, or a broker might want to show a customer a visual confirmation of a financial transaction that the customer has just made orally over the telephone. Image data can be transmitted over a telephone line, for example, using conventional facsimile machines or the VoiceView ™ products marketed by Radish Communications Systems, Inc. of Boulder, Colo. Alternatively, this data can be in the form of one or more data files to be transferred by modem between the parties' computers. A number of telephone systems have been invented in the past to allow transmission of both voice and data over a single telephone line by switching between voice and data modes, including the following:

| Inventor | Patent No. | Issue Date |
|---|---|---|
| Davis | 5,164,982 | Nov. 17, 1992 |
| Emmons et al. | 4,932,047 | June 5, 1990 |
| Yoshida | 4,815,121 | Mar. 21, 1989 |
| Artom | 4,387,271 | June 7, 1983 |

Davis discloses a telecommunications display system for accommodating both voice and data over a single telephone line. The receiving party ("subscriber") is provided with a display terminal 14 that is connected to the telephone line 22, 52 between the telephone network 50 and the base of the user's telephone 12 as shown in FIG. 1. The display terminal includes a voice/data selector that can automatically recognize digital data and switches from voice communication to data communication modes. This patent discusses one embodiment of the VoiceView# products marketed by Radish Communications Systems, Inc.

Emmons et al. disclose an example of a conversational video phone. The device communicates both audio signals and freeze-frame video images over a standard telephone line.

Yoshida et al. disclose a telephone communication system that recognizes speech and automatically switches from data to speech transmission.

Artom discloses another example of a telephone system for combining voice and data communications over a single telephone line.

The second problem addressed by the present invention arises from the difficulty of interfacing with the multitude of existing PBX telephone systems that employ proprietary communications protocols between the PBX and its station telephones. Conventional modems, fax machines, and the like are designed to interface only with a standard analog telephone line (i.e., plain old telephone service, or POTS). In facilities having a PBX system, the common solution has been to install additional dedicated analog telephone lines that are not routed through the PBX to service these data devices. This solution adds substantial expense, unnecessary complexity, and wasted telephone line capacity.

The proprietary communications protocols commonly used by PBX systems do not extend farther than the base of the telephone set at each station. In particular, the telephone base and handset are connected by a handset cord that has a pair of speaker lines and a pair of microphone lines for analog communication with the handset speaker and microphone, respectively. Therefore, an alternative approach has been to interface the data device (e.g., a modem or fax) to the handset cord by means of a manually operated switch. The speaker and microphone lines in the handset cord appear to the data device simply as a conventional four-wire analog telephone circuit. This allows the data device to transmit and receive analog-encoded data over the handset cord without having to contend with the communication protocol of the PBX system. A number of prior art patents discuss switching arrangements to accommodate both voice and data transmission by inserting a manual switch into the handset cord, including the following:

| Inventor | Patent No. | Issue Date |
|---|---|---|
| Gutzmer | 4,907,267 | Mar. 6, 1990 |
| Serrano | 4,367,374 | Jan. 4, 1983 |

Gutzmer discloses a manual switch for insertion between a telephone handset and base to accommodate both voice and data transmission. Serrano discloses another example of a manual switch inserted between a telephone handset and base to allow both voice and data transmission. A number of similar manual switches are also on the market.

The shortcoming of a manual switch is that the user must manually operate the switch to change from voice to data transmission. In addition, in order to receive data, the sending party must verbally advise the user that data is about to be transmitted and wait while the user at the receiving end manually changes the switch to data mode. This is relatively slow and cumbersome, particularly if the parties wish to switch back and forth between voice and data communications a number of times during a conversation. It also presents the possibility that data can be inadvertently lost or damaged, and voice communications can be lost or clipped due to mis-timed operation of the manual switch. This possibility is further increased if both parties are manually switching between voice and data modes.

The manual switching arrangement discribed in the Gutzmer patent has been improved upon in two products manufactured by Unlimited Systems Corp., Inc. of San Diego, Calif. These products are described in the "KONEXX Model 112 Operating Instructions" and the "KONEXX Model 108 Operating Instructions." Both KONEXX devices are intended to provide an interface between the telephone base and handset for a data device, such as a fax machine or a modem. The user manually takes the telephone handset off-hook and places a call to a remote station. For example, when used with a fax machine, the user would place a call to the remote fax machine. Similarly, when used with a modem, the user would place a call to the remote modem (e.g., a bulletin board service). When the remote station answers the call, the user must then manually prompt the data device (i.e., the fax machine or modem) to go off-hook and begin communications with the remote station. The KONEXX device detects the increased current through the telephone line connecting the KONEXX device to the data device when the local data device goes off-hook and automatically couples the data device to the telephone base.

Solution to the Problem

None of the prior art references show an interface system connected between the telephone base and handset to provide automatic voice and data communications. The present invention automatically switches between voice and data communications over a single telephone line, and also circumvents the problems associated with interfacing to PBX systems that use proprietary communications protocols.

SUMMARY OF THE INVENTION

This invention provides a telephone interface that is inserted between the telephone handset and base for automatic switching between voice and data modes of communication. The interface includes a modem having a receive port coupled to the telephone base speaker lines and a transmit port switchably coupled to the base microphone lines, a switch for selectively coupling the telephone handset to the base, and a processor for monitoring data received by the modem and controlling the switch to automatically decouple the telephone handset from the base when data is being received or transmitted by the modem. The modem includes a tone generator that generates a predetermined start signal to signal a remote unit at the other end of the communication link to enter data mode prior to transmitting data. Similarly, the modem includes a tone detector to detect a start signal sent by the remote unit that causes the unit to switch into data mode in preparation for receiving data. The start signal can also include signals designating the rate at which data will be transmitted and its format.

A primary object of the present invention is to provide a telephone handset interface that automatically switches between voice and data communications.

Another object of the present invention is to provide a telephone interface for data communications that can be inserted between the telephone base and handset of virtually any telephone set to circumvent proprietary telecommunications protocols commonly found in PBX systems.

Yet another object of the present invention is to provide a telephone interface that can be readily incorporated into a wide variety of data devices, such as modems, fax machines, and VoiceView TM products.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
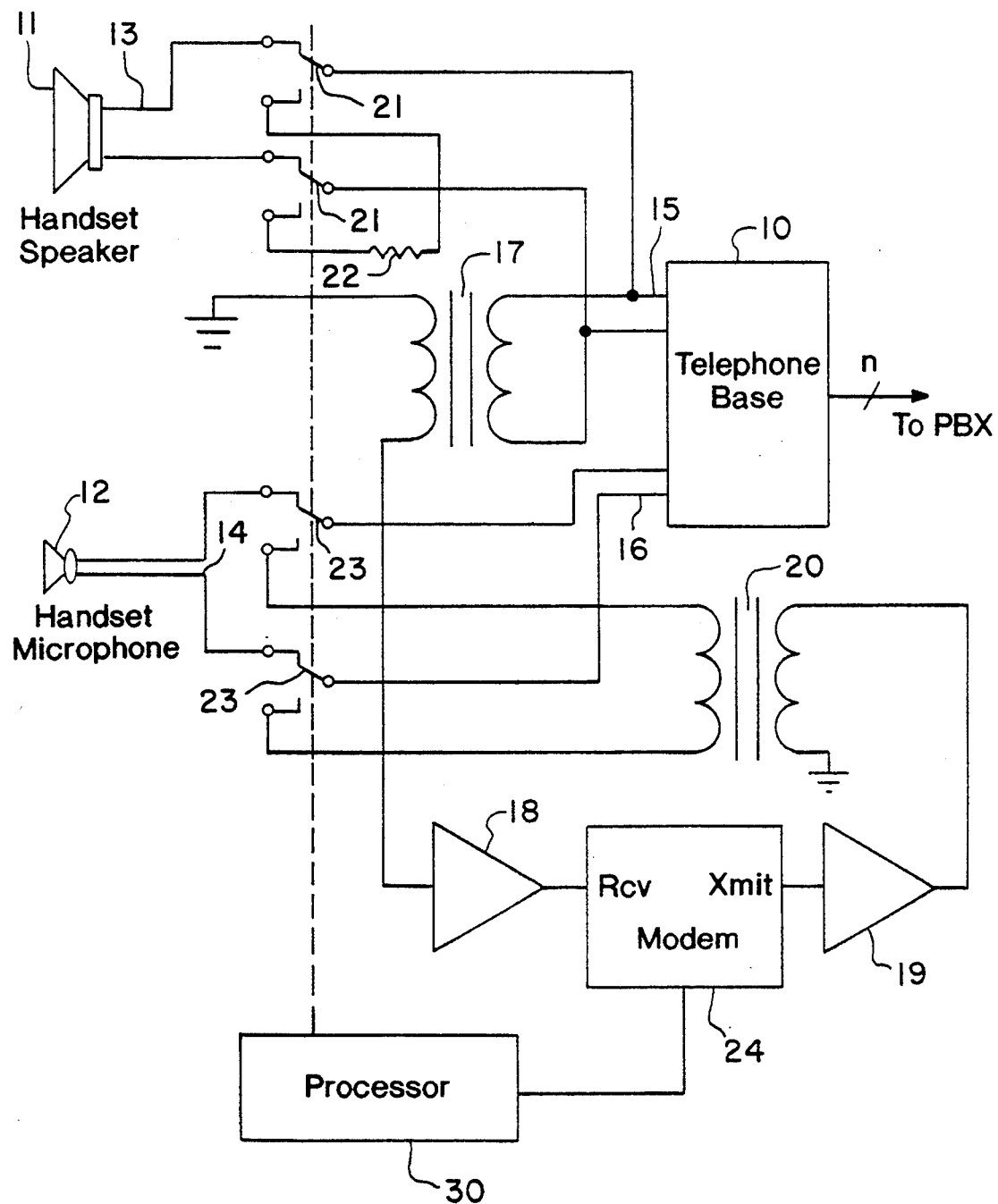
FIG. 1 is a schematic block diagram showing the overall invention.

Turning to FIG. 1, a schematic block diagram is provided showing the handset interface installed between the telephone base 10 and handset 11, 12. In particular, a conventional telephone handset has a speaker 11 associated with its earpiece for converting an analog electrical signal into audible speech, and a microphone 12 associated with its mouthpiece for converting speech into an analog signal. It should be understood that other equivalent units could be substituted for the handset, such as a headset used by telephone operators or a teleconferencing speaker unit used for conference calls. In a conventional telephone set, a handset cord normally extends between the telephone base and the handset. The handset cord typically has a pair of speaker lines and a pair of microphone lines providing full-duplex analog communication from the telephone base with the handset speaker 11 and microphone 12, respectively. The handset cord is also usually equipped with standard jacks at each end that allow the handset cord to be easily connected or disconnected from corresponding connectors in the telephone base and handset.

The present invention is intended to be inserted between the telephone base and handset to selectively couple the telephone handset and base for voice communications, and to selectively couple a modem to the telephone base for data communications. As shown in FIG. 1, the telephone base 10 is connected to a PBX or telephone company central office in the conventional manner using the appropriate communications protocol for the specific telephone system. The pair of speaker lines 15, 13 that would otherwise normally extend from the telephone base 10 to the telephone handset speaker 11 are instead coupled through a relay switch 21 controlled by a computer processor 30. The base speaker lines 15 are also connected to an isolation transformer 17 which is coupled through a buffer amplifier 18 to the receive port of a modem 24. Alternatively, the isolation transformer 17 can be omitted, or a differential amplifier could be substituted to provide isolation. Operation of the modem is also controlled by the processor 30, as will be described in greater detail below. Data received by the modem 24 is demodulated and communicated to the processor 30. The modem 24 is also adapted to modulate and transmit digital data provided by the processor 30 through the transmit port of the modem. This data is transmitted through a buffer amplifier 19 and an isolation transformer 20 to one set of contacts of a relay switch 23. The position of this relay switch is also controlled by the processor 30. The handset microphone 12 is connected by means of a pair of wires 14 to a second set of contacts for the relay switch 23. The pair of microphone lines 16 extending from the telephone base 10 are connected to the other side of the relay switch 23.

Figure 2:
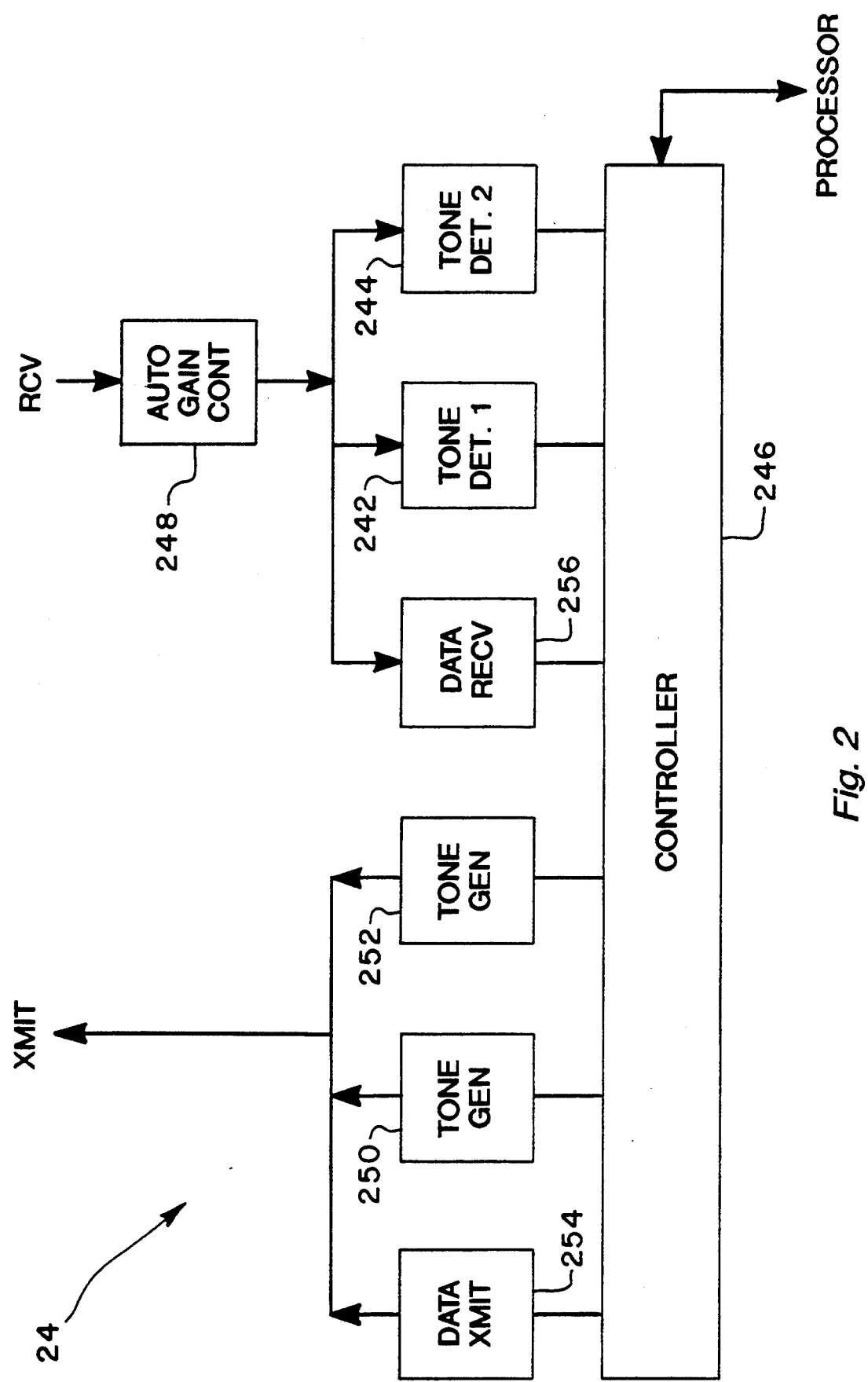
FIG. 2 is a schematic block diagram of the modem.

The components of the modem 24 are shown in greater detail in the block diagram provided in FIG. 2. The signal level at the receive port of the modem is regulated by an automatic gain control amplifier 248. The analog telephone signal is demodulated by the data receive block 256 to deliver corresponding digital data to the modem's controller 246. In the preferred embodiment, the data receive block can be configured by the processor 30 and modem controller 246 to selectively operate at any of a number of different data rates (e.g., V.21 300 bps FSK, V.27ter 4800 bps DPSK, or V.29 9600 bps QAM). The analog signal received by the modem is also monitored by a number of tone detectors 242 and 244 to detect predetermined tones used to signal the start of data transmission and to indicate the data transmission rate and data format. In the preferred embodiment of the present invention, the modem 24 includes tone detectors adapted to detect a start tone defined by frequencies of 2312.5 Hz and 2912.5 Hz for approximately 200 msec. This header is followed by a series of HDLC flags transmitted using the V.21 300 bps (high channel) FSK modulation scheme, which in turn is followed by a tone having one or more combinations of frequencies, such as 2312.5 Hz, 1412.5 Hz, or 811 Hz to designate a data transmission rate (i.e., 9600, 4800, or 300 bps, respectively). Additional tones can be added to the protocol to specify the format or "mode" for the data being transferred (e.g., VoiceView TM, facsimile, conventional modem file transfer, etc.) To transmit, digital data is forwarded by the processor 30 through the modem controller 246 to the data transmit block 254, which modulates and transmits a corresponding analog signal. The modem controller 246 also controls a number of tone generators 250 and 252 used to generate start tones to signal the start of data transmission and to indicate the data rate and format prior to transmitting data to a remote paired unit at the other end of the telephone connection.

In operation, the unit automatically switches between a voice mode and a data mode. Voice mode is the default mode of operation. In voice mode, the processor 30 controls the relay switches 23 and 21 to their released positions shown in FIG. 1. This directly couples the handset speaker lines 13 to the base speaker lines 15 and couples the handset microphone lines 14 to the base microphone lines 16, thereby providing normal voice communications between the telephone handset and base. Additionally, the modem transmit port is disconnected from the base microphone lines by switch 23 to prevent any extraneous signals produced by the modem 24 from interfering with voice communications. However, the receive port of the modem 24 remains coupled to the telephone base speaker lines 15 through the isolation transformer 17. This enables the tone detectors 242 and 244 within the modem 24 to continually listen in on the voice communications and detect the presence of start tones indicating that the remote unit intends to transmit data.

Data mode can be initiated by the processor 30 in either of two situations. The first case occurs when the processor wishes to transmit data to the remote unit. A simplified flowchart of this procedure is provided in FIG. 3 and will be discussed at length below. The second case occurs when the modem tone detectors 242 and 244 detect a start signal indicating that the remote unit intends to transmit. A simplified flowchart of the procedure for receiving such data is provided in FIG. 4. In either case, the processor activates the relay switches 21 and 23 to disconnect the handset speaker lines 13 from the base speaker lines 15, disconnects the handset microphone lines 14 from the base microphone lines 16, and instead couples the modem transmit port to the base microphone lines 16. The relay switch 21 also connects a resistor 22 across the handset speaker lines in data mode to minimize annoying extraneous noise that might otherwise result if the speaker lines are disconnected.

Figure 3:
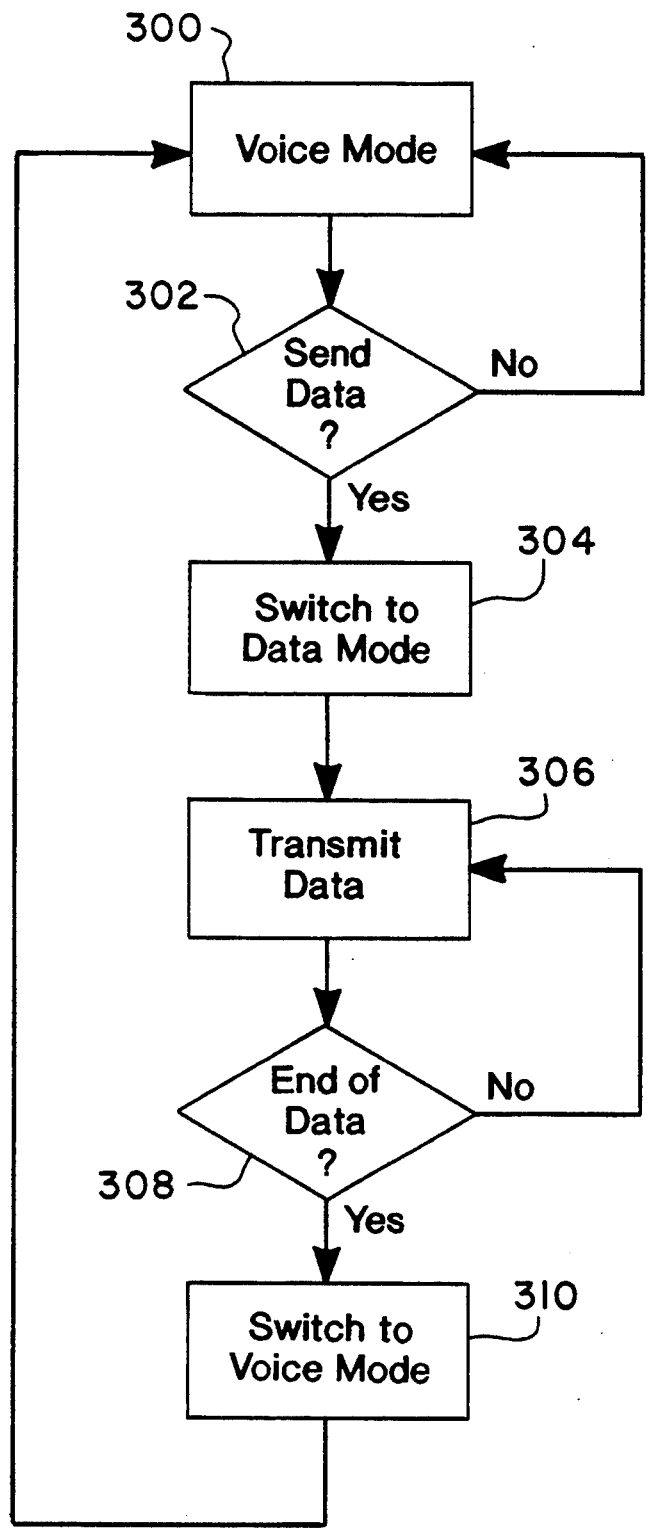
FIG. 3 is a simplified flowchart of the procedure for transmitting data.

FIG. 3 is a simplified flow chart showing a general overview of the procedure for transmitted data to a remote paired unit at the other end of a telephone connection. The transmitting unit begins in the default voice mode 300 with the switches 21 and 23 released to the positions depicted in FIG. 1. At step 302, the processor 30 determines whether the user has indicated a desire to transmit data by pressing a predetermined key or clicking on a predetermined area of the display screen using a mouse, as provided by the application layer. If so, the processor changes the positions of the relay switches 21 and 23 to data mode in step 304, as discussed above. In addition, the processor directs the modem to establish a data link with the remote unit using the communications protocol illustrated in greater detail in FIG. 5. The data block provided by the sending unit's application layer is then transmitted by the modem 24 to the remote unit in step 306. The receiving unit's modem acknowledges receipt of the data using the link turn-around protocol illustrated in greater detail in FIGS. 7 and 8. If necessary, the retry procedure shown in FIG. 9 is employed to retransmit the data block. In step 308, depending on the terminal character inserted at the end of the data block by the application layer, the sending unit's processor may keep the data link with the remote unit intact pending receipt of data back from the remote unit or pending additional data blocks from the sending unit's application layer to be transmitted to the remote unit. After all of the data has been transmitted, the processor returns the unit to voice mode by tearing down the data link using the procedure outlined in FIGS. 10(a) and 10(b), and releasing the relay switches 21 and 23 to their default positions shown in FIG. 1.

Figure 4:
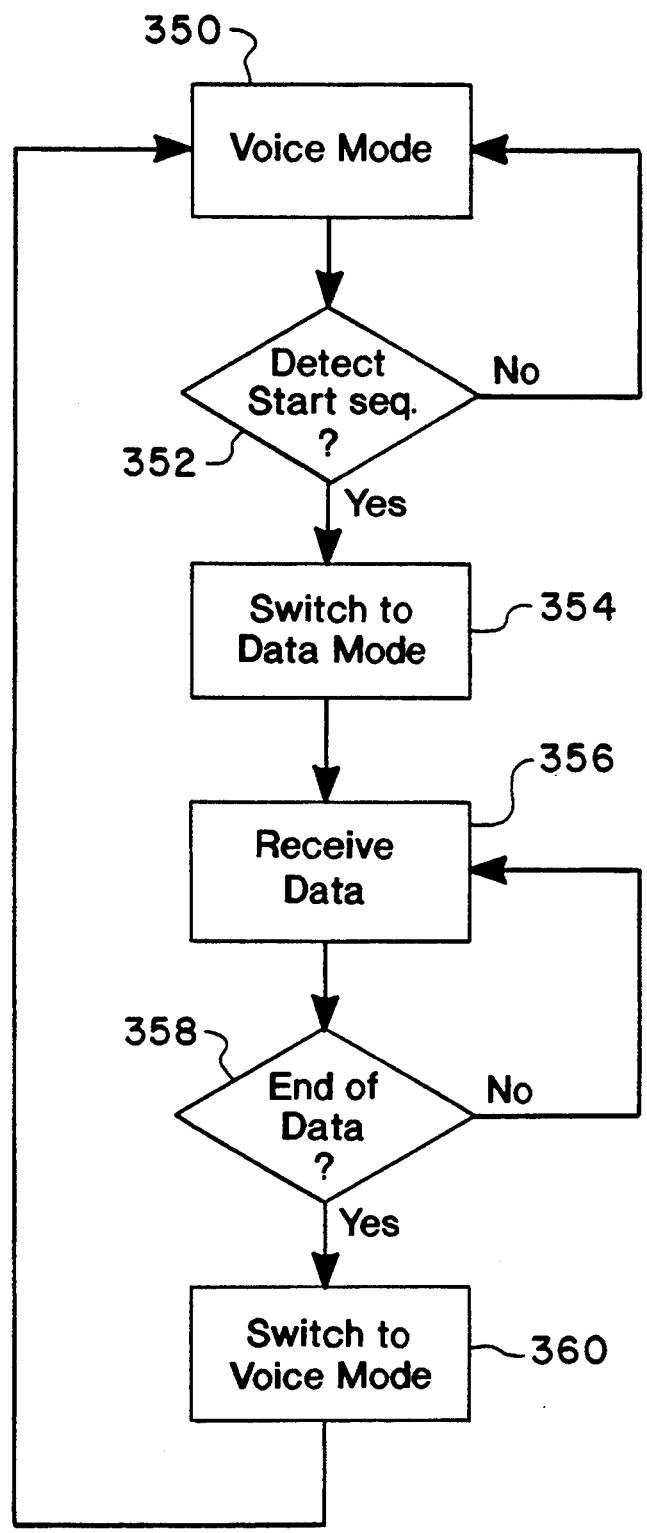
FIG. 4 is a simplified flowchart of the procedure for receiving data.

FIG. 4 is a simplified flow chart corresponding to FIG. 3 showing a general overview of the procedure for receiving data from a remote paired unit. Again the receiving unit begins at step 350 in the default voice mode 350 with the switches 21 and 23 released to the positions depicted in FIG. 1. If the modem detects the start tones followed by the remainder of the start sequence indicating that the remote unit intends to transmit data in step 352, the processor then proceeds to convert the unit to data mode in step 354. In particular, the processor follows the communications protocol outlined in greater detail in FIG. 6 to establish a data link with the remote unit, and changes the relay switches 21 and 23 to their data mode positions, as previously discussed. After the data link has been established, the remote unit transmits its data, which is received and demodulated by the modem 24 in step 356. This data is passed through the processor 30 for use by the unit's application layer. The receiving unit acknowledges receipt of the data using the link turn-around protocol illustrated in greater detail in FIGS. 7 and 8. If necessary, the retry procedure shown in FIG. 9 is employed to retransmit the data block. In step 358, depending on the terminal character at the end of the transmitted data block, the processor may keep the data link with the remote intact pending receipt of additional data from the remote sending unit. After all of the data has been received, the processor returns the unit to voice mode by tearing down the data link using the procedure outlined in FIGS. 10(a) and 10(b), and releasing the relay switches 21 and 23 to their default positions shown in FIG. 1.

Figure 5:
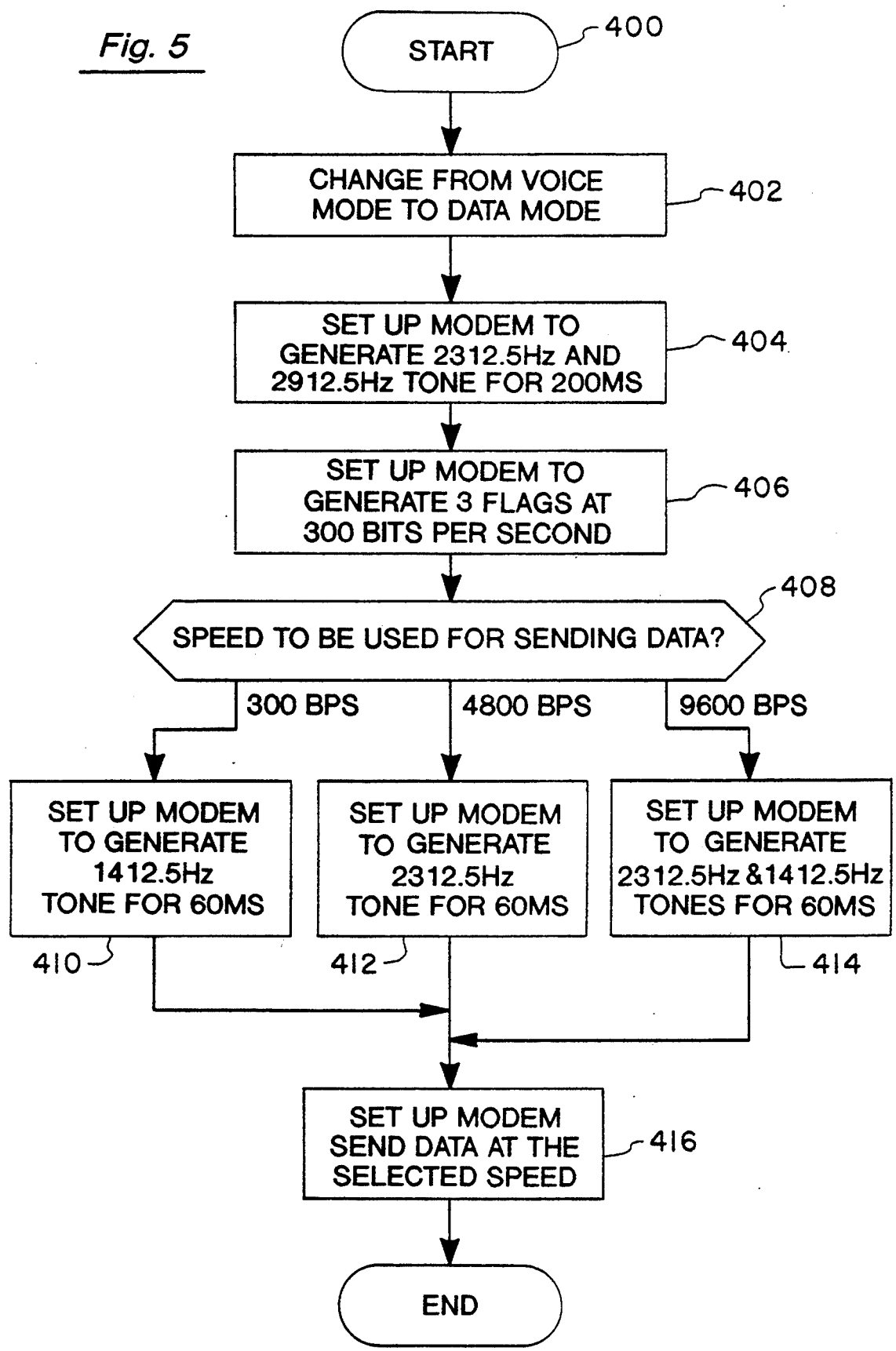
FIG. 5 is a flowchart of the procedure for establishing a link prior to transmitting data.

FIG. 5 is a more detailed flowchart of the procedure for establishing a link prior to transmitting data. The procedure to initiate link establishment to transfer data begins at step 400 with both units in voice mode. For example, the processor 30 of the transmitting unit can be prompted to initiate link establishment when the user presses a predetermined key on the keyboard or clicks a mouse button with the cursor on a Windows screen selection, thereby requesting that a data file be transferred or that visual data on the computer display be transmitted to the remote unit. The details of the application layer and the user interface can vary widely and are outside of the scope of the present invention. For example, the present invention could be implemented as part of an IBM-family personal computer system (e.g., running MS-DOS or Windows), an Apple Macintosh system, or a VoiceView unit communicating with a mainframe or minicomputer.

When triggered by the application layer, the processor 30 changes the position of the relay switches 21 and 23 from voice mode or data mode at step 402, sets up the modem 24 to generate the 2312.5 Hz and 2912.5 Hz start tones at step 404, and directs the modem to generate the three flags at 300 bps at step 406. Next, at step 408, the processor 30 selects the transmission rate to be used in sending data to the remote unit.

The present system can be adapted to operate at any of a wide variety of data transmission rates. As previously mentioned, the preferred embodiment of the present system can operate at either 300 bps, 4800 bps, or 9600 bps. These speeds were arbitrarily selected because they are widely used by other types of telecommunications devices. The following discussion assumes that the system has been implemented with these specific data rates. In general terms, the modem in the present system can be configured by the processor to operate either at a high "priority" rate (e.g., 9600 bps), a medium "recovery" rate (e.g., 4800 bps), or a low "burst" rate (e.g., 300 bps). However, other sets of speeds could be readily substituted.

The transmission speed is determined by the length of the data block to be transmitted. A short data block with few characters can be sent more time efficiently by low transmission speeds that do not require as much time to prepare the link for transmission, such as echo canceler switching and the like, as to prepare for higher-rate transmissions. For example, any data block that is less than four characters is preferably transmitted at 300 bps. Any data block that contains four or more characters is preferably transmitted at a transmission rate of 9600 bps, or 4800 bps if that is the current speed. Therefore, the processor initially selects a transmission rate depending on the length of the data stream to be transmitted, as specified by the application layer. Before any data is transmitted, the processor 30 sets up the modem 24 to generate the data rate indicator tones at step 410, 412, or 414 so that the remote receiving unit can set itself to receive data at the selected speed. Finally the processor 30 sets up the modem 24 to send data at the selected speed, at step 416. Transmission of the data at the selected rate then follows.

Figure 6:
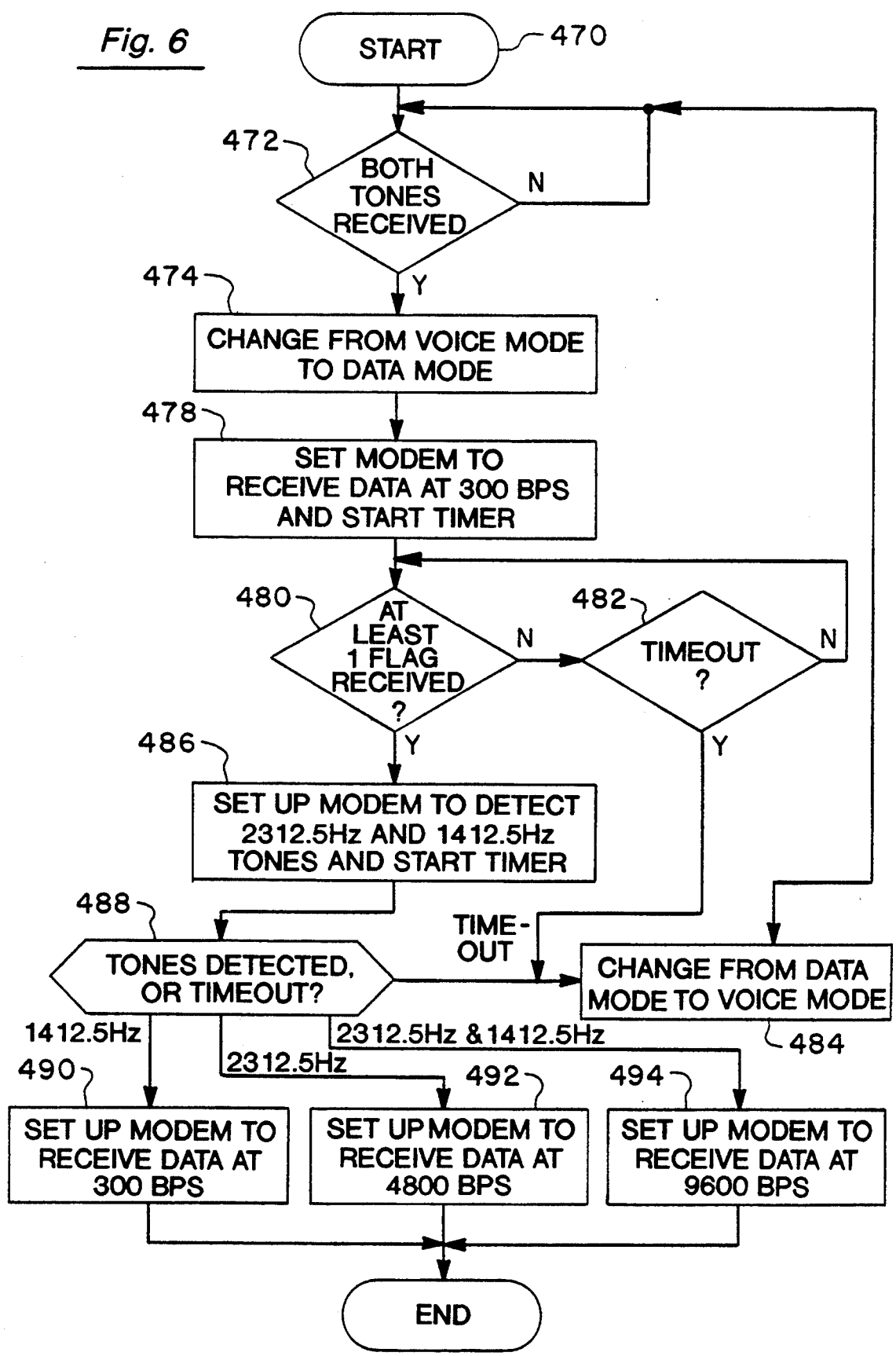
FIG. 6 is a flowchart of the procedure for establishing a link prior to receiving data (i.e., in response to the link establishment procedure initiated in FIG. 5).

FIG. 6 is a more detailed flowchart of the procedure for establishing a link prior to receiving data (i.e., in response to the link establishment procedure initiated in FIG. 5). However, it should be understood that the preferred embodiment allows bi-directional voice and data communications, which requires that both units have the capability to both transmit and receive data. Again, the procedure starts at 470 with the assumption that both units are in voice mode. The modem 24 is set to detect the 2312.5 Hz and 2912.5 Hz start tones, as previously discussed. The first step 472 is for the processor 30 to determine whether both of the 2312.5 Hz and 2912.5 Hz tones were received by the modem. If not, the processor stays in voice mode. If so, the processor 30 changes the positions of the switches 21 and 23 from voice mode to data mode at step 474.

At step 478, the processor 30 sets the modem 24 to receive data at 300 bps and starts a timer. The timer provides an outside time limit to receive the flags before the processor returns the unit to voice mode. Otherwise, a random false signal that sounds like the start tones could cause a switch to the data mode, and leave the unit locked there waiting for flags that never come.

At step 480, the processor monitors whether any of the three flags have been received. If not, step 482 checks to see whether time has run out. If not, the processor continues to wait and monitor. If so, the processor proceeds to step 484 and changes the unit back to voice mode. On the other hand, if at least one flag is detected at step 480, the processor 30 sets up the modem 24 at step 486 to detect the speed tones generated by the remote unit to inform the processor at which baud rate the following data will be transmitted. It also resets the maximum time limit for detecting those tones.

In step 488, the processor 30 determines that either speed-setting tones have been detected or time runs out. If time runs out with no speed tones having been detected, the processor proceeds to step 484 and changes the unit back to voice mode. On the other hand, if the speed tones are detected before time runs out, the processor sets up the modem to receive at either 300 bps (step 490), 4800 bps (step 492), or 9600 bps (step 494) depending on the frequencies of the speed tones. The combination of frequencies of the speed tones is used to uniquely identify the rate at which data will be transmitted. Once the modem is set to receive data at the selected speed, the link is established and data is transmitted from the sending unit to the receiving unit.

Figure 7:
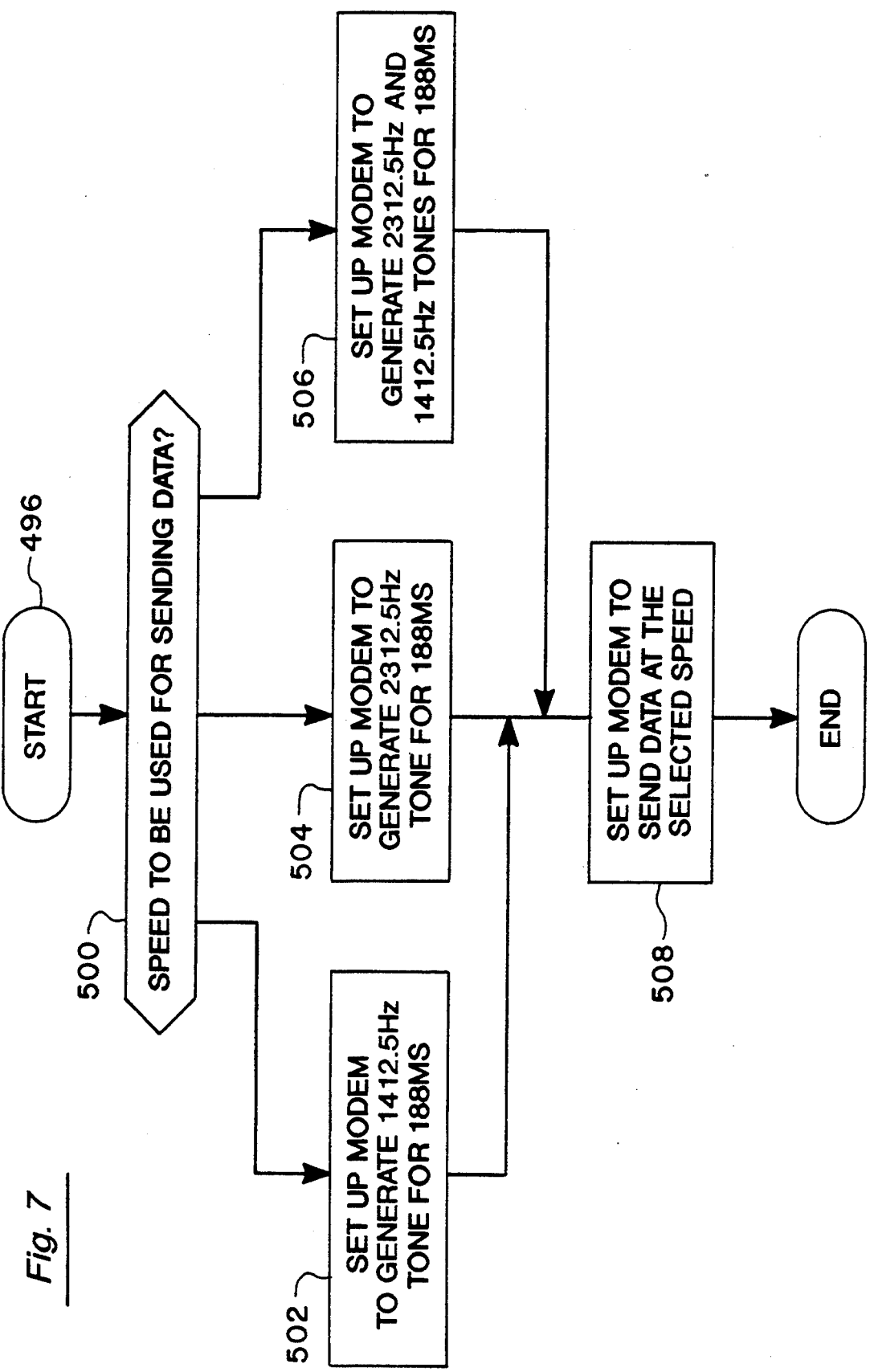
FIG. 7 is a flowchart of the link turn-around procedure for the unit receiving data.

FIG. 7 is a more detailed flowchart of the link turn-around procedure for the unit receiving data. After receiving the data, the processor 30 in the receiving unit turns the link around to transmit acknowledgment data to the sending unit according to the procedure in FIG. 7. Of course, having just received the data, the receiving unit is already in the data mode at the start 496 of the link turn-around procedure. The processor first determines at step 500 which speed it will use to transmit the acknowledgment data according to the criteria discussed above. A simple acknowledgment data transmission is usually very short, and therefore the 300 bps rate is usually selected. In this case, the remote unit's modem is set up at step 502 to transmit a tone to designate the acknowledgment transmission rate to the sending unit. However, since the link turn-around procedure may also be used for other purposes, or for transmitting back other and longer data, steps 504 or 506 can be used to set up the modem to transmit tones for 4800 bps, 9600 bps, or other speeds. Finally, after the speed tones are generated and sent, the processor proceeds to the final link turn-around step 508 and sets up the modem to send the acknowledgment data at the selected speed.

Figure 8:
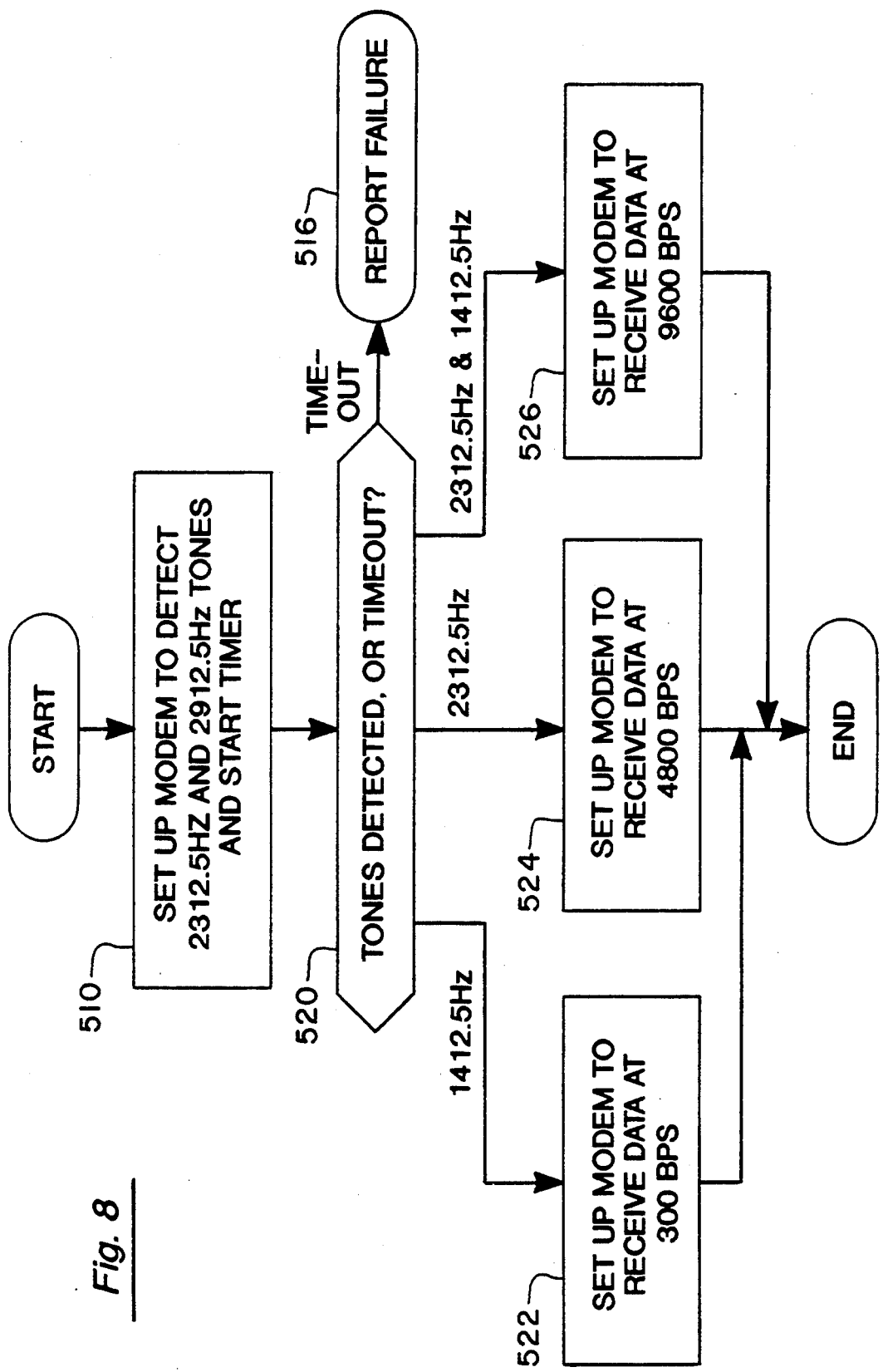
FIG. 8 is a flowchart of the link turn-around procedure for the unit transmitting data.
Figure 9:
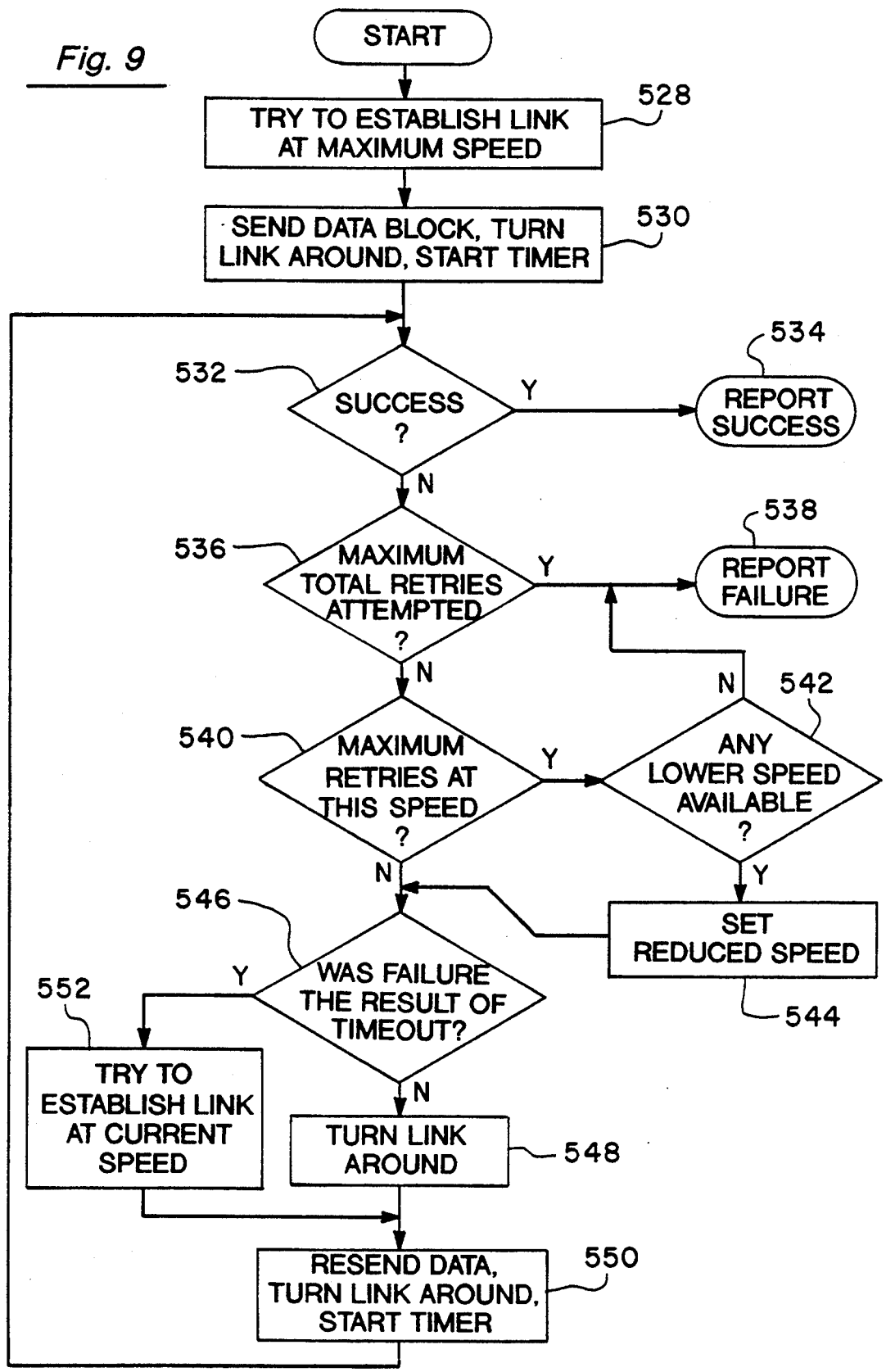
FIG. 9 is a flowchart of the retry procedure for link establishment.

FIG. 8 is a more detailed flowchart of the link turn-around procedure for the other unit (i.e., the sending unit). As described above, after having sent the data, the sending unit's processor sets up its modem at step 510 to detect incoming speed tones. The processor also starts the timer to measure the time elapsed from the setup of the modem until the speed tones are received. At step 520, the processor determines which tones were detected, and thus determines the data rate for the acknowledgment data to be received. If time has run out before this time, a failure is reported at step 516 which may initiate a retry or a return to voice mode. If the speed tones are detected, the sending unit's modem is set up in steps 522, 524, or 526 to receive acknowledgment data at the corresponding data based on the combination of frequencies of the speed tones. The data link is thereby completely turned around, and the sending unit is ready to receive the acknowledgment or other data from the remote unit.

FIG. 9 is a flowchart of the retry procedure for link establishment. At step 528, the data link is established at maximum speed, according to the procedures illustrated in FIGS. 5 and 6 as described above. The default maximum speed is 9600 bps, which in this retry procedure is always the starting retry speed. However, it does not have to be set up this way, so that retries at initial lower speeds can be used, for example, if the preceding transmissions had resulted in reduced speed retries. For example, once the speed has been reduced during a call, it is likely that the lower speed will have to be used in subsequent transmissions anyway, so it may be better to start with a lower speed. In step 530, the block of data is transmitted by the sending unit and the receiving unit turns the link around after receiving the data to send acknowledgment data back to the sending unit, as shown in FIGS. 7 and 8. If transmission of the data was successful at step 532, then the success is reported at step 534 and units return to voice mode. Success means that the link turn-around procedure of FIG. 8 ended without failure and the acknowledgment response received from the receiving unit indicates that all data was received correctly. On the other hand, if a successful transmission is not determined at step 532, the retry procedure goes to the next step 536 to query whether the number of retries has already reached a preset maximum. It would be futile to continue retrying indefinitely to establish a data link and make a successful data transmission when it is obviously not working.

If the maximum number of retries has been reached at step 536, then failure is reported at step 538 and the unit returns to voice mode. However, if the maximum number of retries has not been reached, the next step 540 queries whether the number of retries at the current speed has reached a preset maximum. This step allows a certain number of retries at the current data rate before going to the next lower speed to retry a preset number of times at that speed, too. A retry at lower speeds might work if higher speeds do not.

If the maximum number of retries at a particular speed has been reached at step 540, then the next step 542 determines whether there are any lower speeds available. If no lower speeds are available, then a failure is reported at step 538, as before. If a lower speed is available, step 544 resets the modem data transmission rate to the next lower speed (i.e., from 9600 bps to 4800 bps). At step 546, a check is made to see whether the failure at step 532 was due to excessive time. If not, the next step 548 is to turn the link around again and then resend the data at step 550. After the data has been resent, the link is turned around again, the timer is restarted, and the procedure returns to step 532 to see if the last retry at sending the data was a success. On the other hand, if step 546 determines that failure was due to excessive time, step 552 skips the turn-around step 548 and goes through the link establishment and data transmission operations again. A failure that is not the result of time out occurs when the response received from the remote unit indicates that not all of the data was received correctly. A failure that is the result of time out occurs when the sending unit receives no response at all from the remote receiving unit. Eventually, this retry procedure will cycle enough to report either a success at step 534 or a failure at step 538. In either instance, the ultimate result will return both units to voice mode.

Figure 10B:
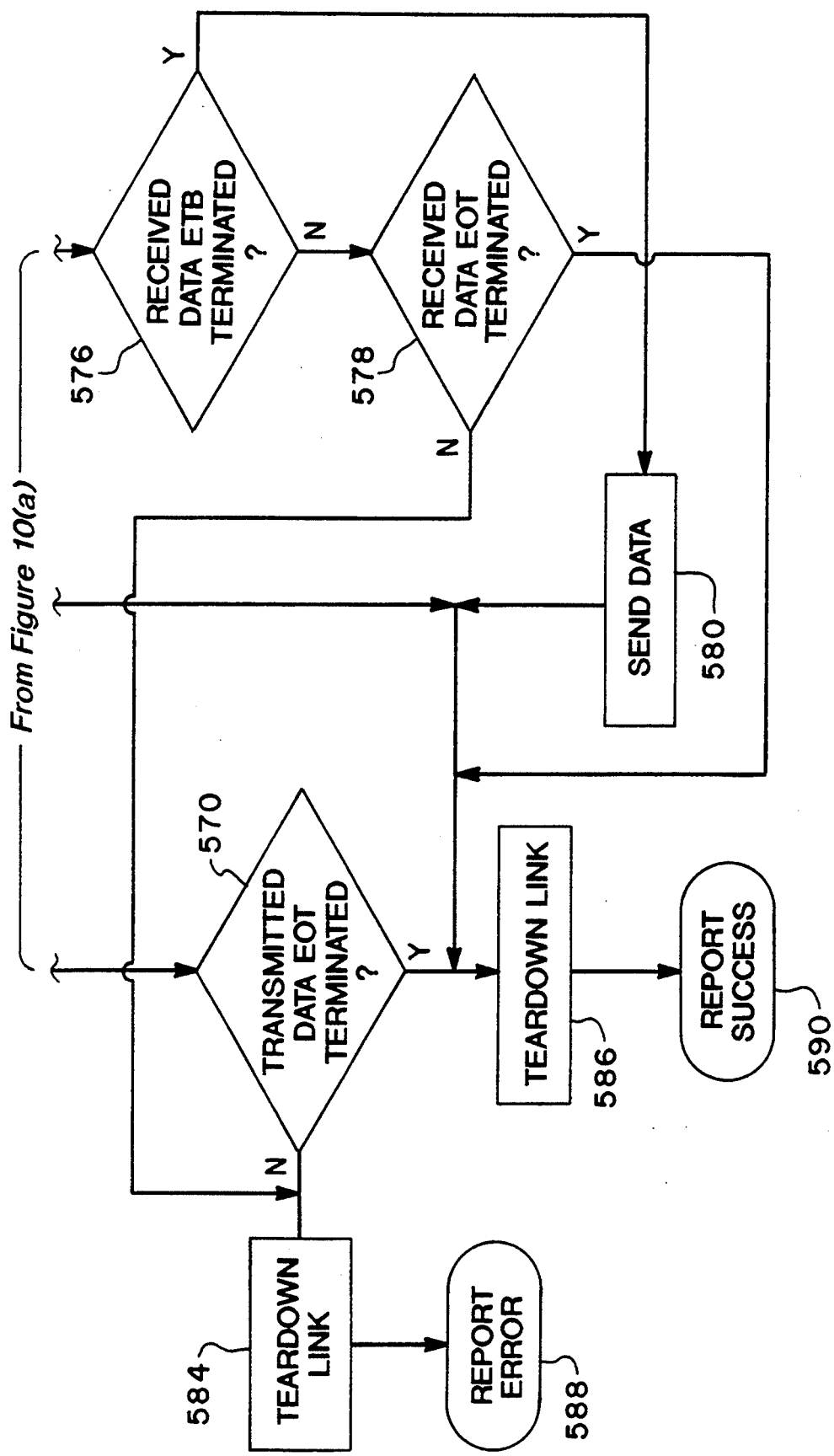
FIGS. 10(a) and 10(b) are flowcharts of the link teardown procedure.
Figure 10A:
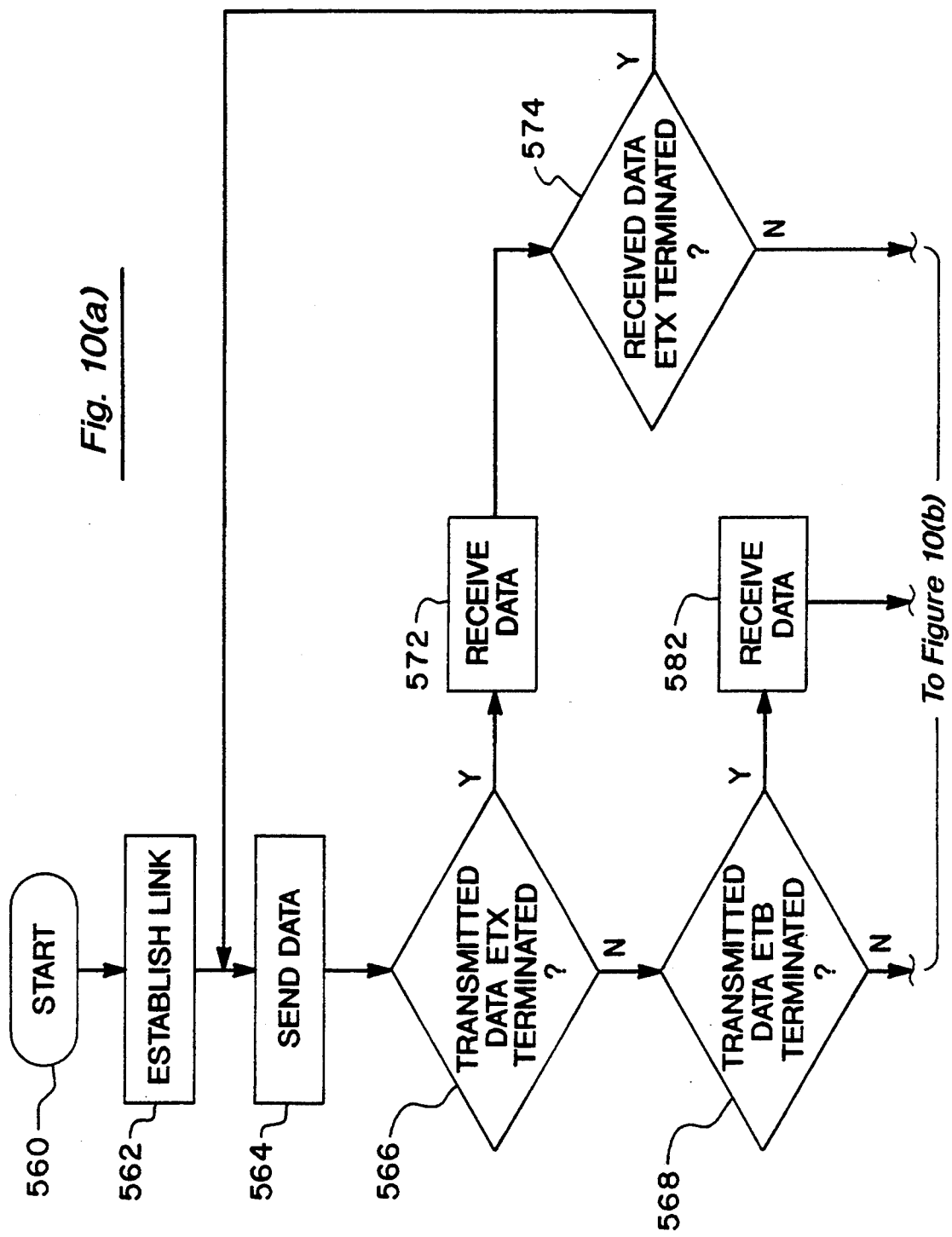

The link tear-down procedure is illustrated in FIGS. 10(a) and 10(b) from the standpoint of the sending unit. The tear-down procedure from the standpoint of the receiving unit is essentially the same. As previously discussed, the procedure for starting data mode 560 can be initiated by a user keystroke or mouse click, depending on the details of the application layer. Upon receipt of this "send" signal from the application layer, the processor 30 establishes the data link in step 562, as previously described and illustrated in FIGS. 3 and 5. This step may include some or all of the retry procedure illustrated in FIG. 9. With the data link established, the processor 30 instructs the modem 24 at step 564 to send the data to the receiving unit.

In the preferred embodiment of the protocol used in association with the present invention, the application layer of the sending unit must decide before the end of a data transmission whether no response, one response, or open-ended exchanges will be allowed. The term "response" as used for this purpose means a response from the peer application layer of the remote unit, and not the normal acknowledgment data that is exchanged to ensure data integrity. For example, no response may be selected for the usual case in which a unit transfers a screen of data or a data file to a remote receiving unit, while one response might be appropriate if the sending unit wishes to retrieve some information from the remote unit, such as the amount of memory space available. Open-ended exchanges may be selected when the protocol is used between two units for conversational or back-and-forth transactions. This protocol therefore requires that each data transmission must be terminated with one of the following characters: ETX, ETB, or EOT. An ETX character is used to signal that an open-ended exchange is allowed. An ETB character indicates that one response is allowed. An EOT character indicates that no response is permitted. Therefore, the sending unit's processor has to determine which response option (ETX, ETB, or EOT) has been designated by the application layer. This determination occurs in steps 566, 568, and 570 of FIGS. 10(a) and 10(b).

In step 566, the processor 30 checks the end of the data block provided by the application layer to see if it has an ETX character at the terminal end of the data. If so, the sending unit's processor cannot tell whether the current data transmission that just ended was the last one expected in an exchange or whether it should expect responding data to come back from the remote receiving unit. Therefore, it does not start to tear down the data link. Instead, it leaves the sending unit in data mode and waits to receive data from the remote unit. On the other hand, if the current data transmission coming from the sending unit's application layer is not terminated with an ETX character, the processor proceeds to the next step 568 to check for an ETB character, as will be described below. If the ETX character was detected at step 566 and the data link is left intact, as described above, the next step 572 would be to receive the next data transmission from the remote unit. Since both units operate under the same protocol, any data transmission received from the remote unit by the sending unit at step 572 also has to end with one of the characters ETX, ETB, or EOT. Therefore, the sending unit's processor can also tell from the data transmission received from the remote unit whether the data link is to be torn down. Consequently, at step 574, the data received in step 572 from the remote unit is checked by the processor for the terminal character ETX. If ETX is present, the controller still does not tear down the data link and leaves the sending unit in data mode ready to send more data, as determined by the application layer. However, if the data received in step 572 does not terminate with an ETX, the processor checks for an ETB in the next step 576. If an ETB is present, the indication is that the remote unit expects to receive just one more response from the sending unit. Therefore, the processor keeps the sending unit in data mode for sending one more data transmission at step 580. However, if an ETB is not detected at step 576, the processor goes to the next step 578 and checks for the EOT character. If the EOT character is not present, the indication is that end of data transmission did not arrive. Therefore, the processor tears down the data link at step 584 to return to voice mode and reports an error at step 588. If EOT is detected at step 578, the processor knows that nothing else is expected either from or to the remote unit, and so it tears down the data link at step 586 and reports success at step 590. At the same time, the remote unit would also have torn down its data link and returned to voice mode in response to the same EOT character.

Returning to step 568, if the original data transferred by the sending unit to the remote unit did not terminate with an ETX, the processor checks for the ETB character at the end of the data transmission. If the ETB is present, then one more response is expected from the remote terminal, so the data link is left intact to receive that response. The expected "one data" response from the remote unit is then received at step 582, and upon receipt, the processor proceeds immediately to step 586 to tear down the link and return to voice mode. It also reports the successful data transfer at step 590.

Finally, if there was no ETB at step 568, the processor checks for EOT in the data transmission at step 570. If EOT is not detected, it tears down the link to return to voice mode at step 584 and reports the error at step 588. However, if the EOT is detected at step 570, the processor tears down the link at step 586 to return to voice mode and reports a successful data transfer. As mentioned above, the remote receiving terminal operates under the same protocol in the preferred embodiment of the present invention, so a separate description of the link tear-down procedure for the remote unit would be redundant.

The processor 30 can be used in the present invention to set the transmit signal level for the modem 24. In one embodiment, the application layer asks the user to specify the type of telephone system at the time the unit is installed. This information is relayed to the processor 30 which selects the appropriate transmit level from a built-in table of transmit levels based on the type of telephone system.

The processor 30 can also be used to adaptively set the transmit level for the modem 24 as part of the link establishment and retry procedures previously discussed. For example, the processor may initially set up the modem to transmit a predetermined default level based on the type of telephone system. If this is unsuccessful, the processor may retry using successively greater transmit levels.

The foregoing discussion has presented a high-level description to show the inventive concepts of this telecommunications system in a concise and understandable manner, as well as to enable persons skilled in this art to practice the invention. There are, of course, many more details involved in implementing the invention that are common and known to persons skilled in the art, such as implementing the HDLC protocol and the details of presenting a suitable user interface for the modem, the application layer, data compression algorithms, and the like.

The above disclosure sets forth a number of embodiments of the present invention. Other arrangements or embodiments, not precisely set forth, could be practiced under the teachings of the present invention and as set forth in the following claims.

We claim:

1. A telephone interface system for providing voice and data communications with a remote unit over a telephone line via a telephone set having a handset and a base, with a pair of speaker lines and a pair of microphone lines extending from said handset for communication with said base, and corresponding pairs of base microphone and speaker lines extending from said base for communication with said handset, said interface system comprising:

a modem for receiving and transmitting data having a receive port coupled to said base speaker lines and a transmit port coupled to said base microphone lines;

switching means for selectively coupling said handset speaker lines to said base speaker lines; and a processor for monitoring data received by said modem and controlling said switching means to automatically switch between a data mode of operation in which said handset speaker lines are decoupled from said base speaker lines when data is being received or transmitted by said modem, and a voice mode of operation in which said handset speaker lines are coupled to said base speaker lines in accordance with a predetermined communications protocol with said remote unit.

2. The telephone interface system of claim 1, wherein said modem transmit port is switchably connected to said base microphone lines by said switch means; and wherein said switching means in said voice mode:
   (a) couples said handset speaker lines to said base speaker lines;
   (b) couples said handset microphone lines to said base microphone lines; and
   (c) disconnects said modem transmit port from said base microphone lines; and in said data mode, said switching means:
   (a) disconnects said handset speaker lines from said base speaker lines;
   (b) disconnects said handset microphone lines from said base microphone lines; and
   (c) couples said modem transmit port to said base microphone lines.

3. The telephone interface system of claim 1, wherein said processor directs said switching means to initiate said data mode when a predetermined start signal is received by said modem.

4. The telephone interface system of claim 3, wherein said start signal comprises a predetermined signal indicating the transmission rate for data.

5. The telephone interface system of claim 4, wherein said modem is capable of selectively communicating data at any of a plurality of data rates; said start signal comprises a tone having a frequency selected from a corresponding plurality of predetermined frequencies to indicate one of said data rates; and said telephone interface system comprises means to set said modem data rate according to the frequency of said start signal tone.

6. The telephone interface system of claim 3, wherein said modem further comprises means for generating and transmitting said start signal prior to transmitting data.

7. The telephone interface system of claim 3, wherein said start signal comprises a predetermined signal indicating the format of data to be transmitted.

8. The telephone interface system of claim 3, wherein said switching means connects a resistor across said handset speaker lines in said data mode.

9. The telephone interface system of claim 1, wherein said processor directs said modem to transmit at a predetermined signal level based on the type of said telephone set.

10. A telephone interface system for providing voice and data communications over a telephone line via a telephone set having a handset and a base, with a pair of speaker lines and a pair of microphone lines extending from said handset for communication with said base, and corresponding pairs of base microphone and speaker lines extending from said base for communication with said handset, said interface system comprising:
    a modem for receiving and transmitting data, having a receive port coupled to said base speaker lines and a transmit port coupled to said base microphone lines;
    switching means for selectively coupling said handset speaker and microphone lines to said corresponding base speaker and microphone lines; and
    a processor for communicating said data with said modem, and for controlling said switching means in either:
    (a) a data mode in which said switching means decouples said handset speaker lines from said base speaker lines while data is being received or transmitted by said modem, said data mode for receiving data being initiated when a predetermined start signal is received by said modem; or
    (b) a voice mode in which said switching means couples said handset speaker lines to said base speaker lines while data is not being received or transmitted by said modem.

11. The telephone interface system of claim 10, wherein said modem transmit port is switchably connected to said base microphone lines by said switch means; and wherein said switching means in said voice mode:
    (a) couples said handset speaker lines to said base speaker lines;
    (b) couples said handset microphone lines to said base microphone lines; and
    (c) disconnects said modem transmit port from said base microphone lines; and in said data mode, said switching means:
    (a) disconnects said handset speaker lines from said base speaker lines;
    (b) disconnects said handset microphone lines from said base microphone lines; and
    (c) couples said modem transmit port to said base microphone lines.

12. The telephone interface system of claim 10, wherein said processor directs said modem to transmit at a predetermined signal level based on the type of said telephone set.

13. The telephone interface system of claim 10, wherein said start signal comprises a predetermined signal indicating the data transmission rate.

14. The telephone interface system of claim 13, wherein said modem is capable of selectively communicating data at any of a plurality of data rates; said start signal comprises a tone having a frequency selected from a corresponding plurality of predetermined frequencies to indicate one of said data rates; and said telephone interface system comprises means to set said modem data rate according to the frequency of said start signal tone.

15. The telephone interface system of claim 10, wherein said start signal comprises a predetermined signal indicating the format of data to be transmitted.

16. The telephone interface system of claim 10, wherein said modem further comprises tone generator means for generating and transmitting said start signal prior to transmitting data.

17. A telephone interface system for providing voice and data communications over a telephone line via a telephone set having a handset and a base, with a pair of speaker lines and a pair of microphone lines extending from said handset for communication with said base, and corresponding pairs of base microphone and speaker lines extending from said base for communication with said handset, said interface system comprising:
    a modem for receiving data through a receive port coupled to said base speaker lines and transmitting data through a transmit port switchably coupled to said base microphone lines, said modem also having:

(a) tone detector means for detecting a predetermined start signal received by said receive port; and (b) tone generator means for transmitting a predetermined start signal through said transmit port;

a processor in communication with said modem for controlling operation in either data mode while data is being received or transmitted by said modem, or voice mode to provide audio communication via said handset; said processor initiating data mode for receiving data when said tone detector detects said start signal; and said processor controlling said tone generator to transmit said start signal prior to transmitting data; and switching means controlled by said processor, wherein said switching means in said voice mode:

(a) couples said handset speaker lines to said base speaker lines;

(b) couples said handset microphone lines to said base microphone lines; and (c) disconnects said modem transmit port from said base microphone lines; and in said data mode, said switching means:

(a) disconnects said handset speaker lines from said base speaker lines;

(b) disconnects said handset microphone lines from said base microphone lines; and (c) couples said modem transmit port to said base microphone lines.

18. The telephone interface system of claim 17, wherein said start signal comprises a predetermined signal indicating the data transmission rate.

19. The telephone interface system of claim 18, wherein said modem is capable of selectively communicating data at any of a plurality of data rates; said start signal comprises a tone having a frequency selected from a corresponding plurality of predetermined frequencies to indicate one of said data transmission rates; and said telephone interface system comprises means to set said modem data rate according to said start signal tone.

20. The telephone interface system of claim 17, wherein said start signal comprises a predetermined signal indicating the format of data to be transmitted.

21. The telephone interface system of claim 17, wherein said switching means connects a resistor across said handset speaker lines in said data mode.

* * * * *